Sept. 27, 1932.   O. J. KEHL   1,879,299
HAYRACK
Filed Oct. 22, 1929   2 Sheets-Sheet 1
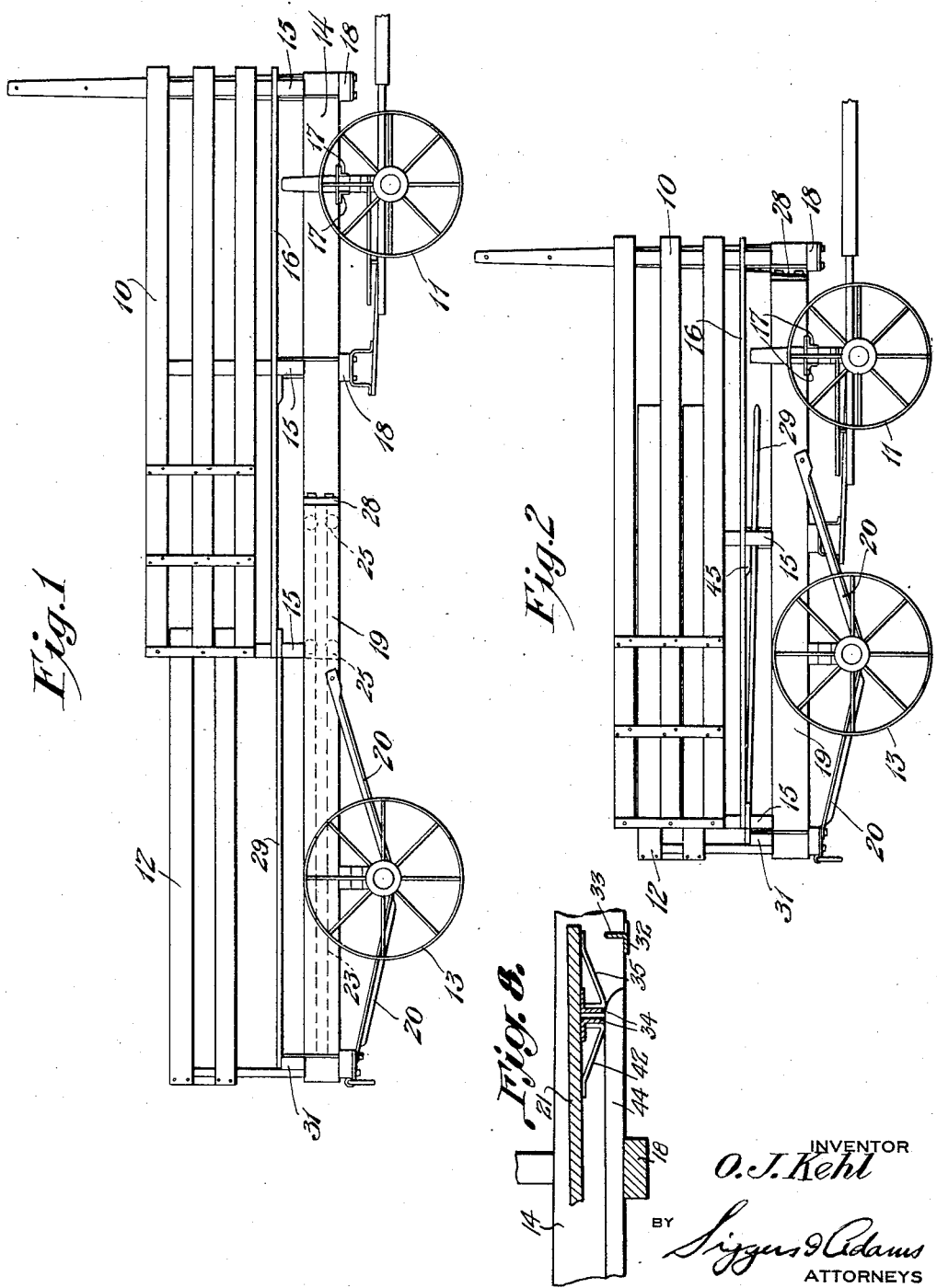
INVENTOR
O. J. Kehl
BY
Siggers & Adams
ATTORNEYS Sept. 27, 1932.  O. J. KEHL  1,879,299
HAYRACK
Filed Oct. 22, 1929  2 Sheets-Sheet 2
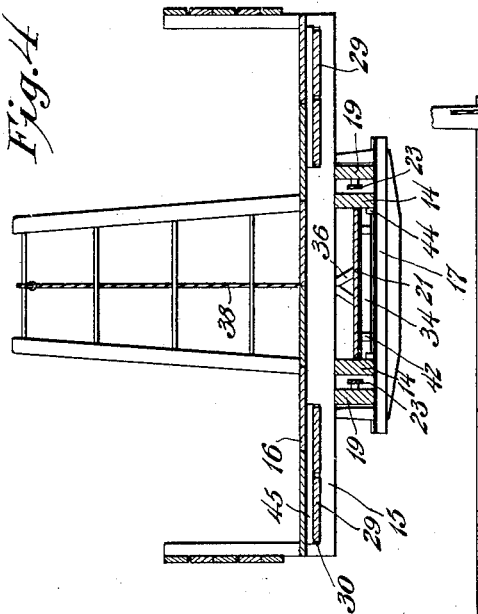
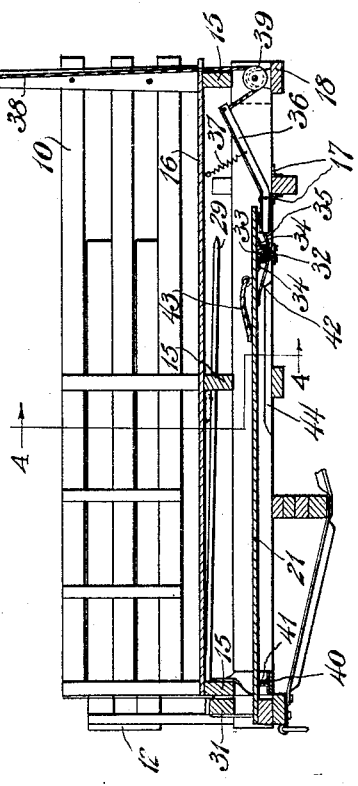
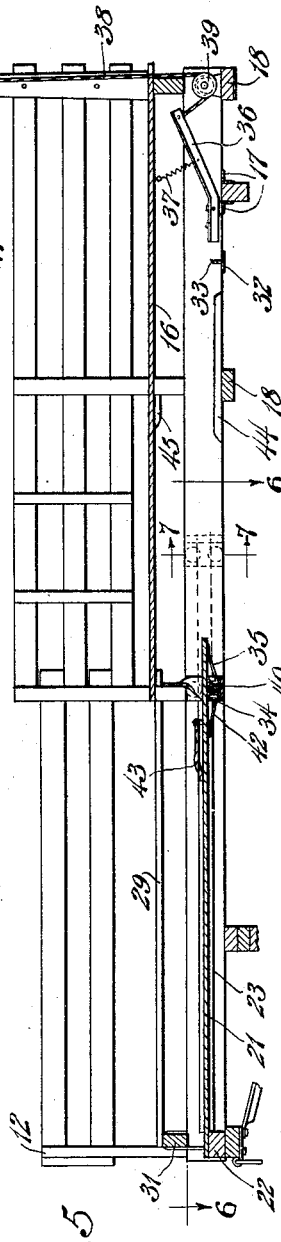
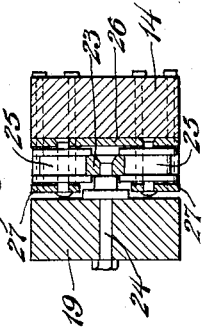
INVENTOR
O. J. Kehl
BY
Siggers & Adams
ATTORNEYS Patented Sept. 27, 1932

1,879,299

UNITED STATES PATENT OFFICE

OSCAR J. KEHL, OF ELIZABETH, ILLINOIS

HAYRACK

Application filed October 22, 1929. Serial No. 401,548.

This invention relates to hay racks, and, among other objects, aims to provide an improved relatively simple durable and inexpensive sectional, extensible rack for hay wagons so constructed and arranged that an ordinary hay loader may fill the front section while the rear section is telescoped and, then, the rear section may be released and extended by the simple expedient of driving the horses forwardly until the sections are automatically locked in extended position so that the rear section may be loaded.

Other aims and advantages of the invention will appear in the specification, when considered in connection with the illustrative embodiment thereof shown in the accompanying drawings, wherein:

Fig. 1 is a side elevation of the preferred form of rack showing two sections in their extended position;

Fig. 2 is a similar view showing the sections telescoped;

Fig. 3 is a longitudinal sectional view of the rack with the two sections telescoped;
Fig. 4 is a sectional view taken on the line 4—4 of Fig. 3;

Fig. 5 is a longitudinal sectional view showing the two sections extended;

Fig. 6 is a horizontal sectional view taken on the line 6—6 of Fig. 5;

Fig. 7 is a sectional view taken on the line 7—7 of Fig. 5; and

Fig. 8 is a fragmentary sectional view on an enlarged scale showing locking members for the sections.

As is well known, it is necessary that basket hay racks shall have a very large capacity in order to carry as much hay as an ordinary team can pull. Many attempts have been made to produce practical and durable extensible racks to add to the capacity of a wagon of ordinary dimensions. However, it has been the custom to extend such racks to their limit before the hay is loaded on them.
It is one of the aims of this invention to provide a simple and relatively inexpensive extensible rack which has provision to be loaded one section at a time and to be extended after the front section is loaded, so that the rear section may be loaded separately. It is a distinct advantage to be able to load the two sections separately because this enables the hay to be picked up very easily. If both sections were loaded simultaneously, it would be difficult to pick up a forkful of hay because it is entangled throughout the length of the load on the rack. Furthermore, an automatic hay loader will load the hay on each section of the improved rack in separate rounded piles; whereas, if the sections were extended, it would be necessary to move the hay in the frame, requiring the work of an extra man. In short, the idea is to do away with the necessity for one extra man in the loading operation.

Referring particularly to the drawings, the preferred form of rack is there shown as being applied to a hay wagon in which a front section 10 is mounted on the bolster of the front wheels 11 and a rear section 12, fixed on the bolster of the rear wheels 13, is arranged to be telescoped on the front section. Herein, the front section is somewhat longer than the rear section and each section has the usual basket frame members at the front and sides for sustaining the load.

The forward section is shown as having side frame members or stringers 14 adapted to rest on the front bolster and mounted on these side frame members are spaced cross beams or sills 15 supporting stationary or fixed floor boards 16. The frame is held or locked against relative longitudinal movement with respect to the front wheels by means of a pair of angles 17 adapted to straddle the front bolster. Secured to the lower edges of the side frames are a pair of cross members or beams 18 one at the front end and the other about midway the length of the frame as clearly shown in Figs. 1 and 5.

As has already been stated, the rear section 12 is arranged to telescope or slide with respect to the front section so that it can be extended when desired. For this purpose, the rear section has side frames or stringers 19 spaced farther apart than the stringers 14 of the front section so as to straddle both stringers of the front section. These stringers are suitably fixed to the bolster on the rear axle and braced by means of brace members 20. A sub-floor section composed of boards 21 secured at their rear ends only to a cross beam or frame member 22 conveniently secured by bent plates to the side members, is arranged between the side members 19 so as to slide under the floor 16 between the stringers 14 of the front section.

A telescoping or sliding connection between the two sections may be provided in various ways, but herein the side frame members 19 of the rear section are shown as having track members in the form of flat bars 23 secured to their inside faces and extending longitudinally thereof, being bolted to said members by means of special bolts 24 having spacer members to hold the tracks spaced from the frame. These tracks are secured in this manner at suitable intervals along the side frame members and are adapted to roll between upper and lower pairs of grooved rollers 25 fixed to the outside faces of the front side frame members 14 as clearly shown in Fig. 7. These rollers are conveniently mounted between a single plate 26 on each side frame member 14 and a pair of separate plates 27 on the opposite sides of the rollers held in proper spaced relation from the plate 26 by means of spacer blocks and suitable securing bolts.

Referring to Fig. 5, there are two such pairs of rollers on each side frame, one pair being arranged at the rear end of the front section and the other being spaced therefrom a suitable distance to afford adequate support for both sections and thereby prevent collapse thereof between the wheels of the wagon. At the forward end of each of the rails there is shown a stop block 28 adapted to strike the front pairs of rollers and prevent the rear section from sliding out over the front section and separating therefrom.

In order to lock the rear section in telescoped position, there is shown a cross bar in the form of a structural angle 32 extending across the two side frame members or stringers 14. The idea is to provide a vertical flange 33 with which a pair of spaced angle plates 34 across the forward ends of the boards 21 are adapted to engage (Fig. 3).

It will be understood that the forward ends of the floor boards 21 have to be lifted in order for the flanges of the angles 34 to straddle the upstanding flange 33 of the cross bar 32. In order for the sections to lock themselves automatically upon being telescoped, there is shown a forward guide member in the form of a bracket 35 secured at its front end to the bottom of the boards and at its rear end to the forward flange member 34, the arrangement being such that the guide member will ride over the edge of the upstanding flange and lift the boards so that they will fall into locked engagement with the flange 33 as shown in Fig. 3. To release the lock, there is shown an angular trip lever 36 pivotally mounted on one of the angle members 17 of the forward section and having its rear end adapted to engage beneath the boards. Referring to Fig. 3, this lever is shown as being normally held out of engagement with the boards and out of their path of movement by means of a spring 37. This lever may be rocked or actuated in various ways, but there is here shown a rope or flexible element 38 trained through a sheave or about a pulley 39 below the floor boards of the forward section and extending upwardly to the top of the front basket frame where it is easily accessible to the driver without moving from his position. By pulling up on the rope, it will be seen that the lever will raise the forward ends of the floor boards and release the lock or the flanges 34 from the flange 33. Then, the horses may be driven forwardly and the rear section will stand still while the forward section slides with respect to it and thus opens up the basket frame automatically.

To lock the two sections in extended position, there is shown another cross bar 40 which may be and preferably is formed of a pair of structural angles resembling a structural T element extending across the rear frame section and likewise presenting upstanding flanges 41 similar to the flange 33 of the front locking bar. The two angle locking members 34 are adapted to cooperate with this locking bar in the same manner as has just been described, a guide member or bracket 42, similar to the guide 35 being also provided to lift the floor boards 21 automatically and guide the flanges 34 into locking position over the upstanding flange 41. This lock may also be released by lifting the forward ends of the floor boards 21 in any one of a number of different ways. Conveniently, a piece of chain or a rope 43 is secured to the upper side of the floor boards at their forward end so that the driver may easily stand on the rear end of the floor 16 and hold the lock released while backing the horses and the two sections will automatically telescope.

Since the floor boards 21 and the side floor boards 29 of the rear section are free at their forward ends and have to be guided during their sliding movement, it is desirable to insure that they will not sag unduly and that the side floor boards will be guided properly in their openings 30 through the cross beams. In this example, guiding cleats 44 having beveled forward and rear ends are attached to the inner faces of the side frame members 14 to guide the locking flanges and their brackets so that the front guide bracket will properly engage the upper edge of the flange 33 on the locking bar 32. This prevents undue sagging of the front boards when the rear section is almost fully telescoped, it being understood that the floor boards intermediate their ends ride over the upper edge of the rear locking bar 40 (see Fig. 3). Cleats 45 having beveled rear ends are shown as being secured to the floor boards 16 of the forward section at the opposite sides to guide the floor boards 29 of the rear section into slots 30 in the intermediate cross beam 15 of the forward section. The front ends of the boards 29 may be slightly beveled as shown in Fig. 3 so as to ride freely over the beveled rear ends of the cleats.

From the foregoing description, it will be seen that the improved hay rack is very simple in its mechanical construction; that it has relatively few parts that are apt to get out of order and hence will require very little expense for up-keep; that the sections may be easily telescoped or extended by a driver without getting off the rack; that the construction and arrangement is such as to enable an automatic hay loader to load the sections independently and apply the load properly to each one without being moved and without the necessity of moving the hay after it is deposited by the loader; and that the hay so deposited can easily be removed from the rack by picking up forkfuls from each section. In fact, actual experience with a rack embodying the invention has fully demonstrated its superior qualities and has resulted in the elimination of one laborer in connection with the loading operation.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A hay rack of the character described comprising, in combination, a front section adapted to be supported upon the front wheels of a wagon; a rear wheel-supported section slidably connected to the front section and partially supported thereby; a fixed locking member on the front section; and yieldably mounted floor boards having cooperating locking means carried by the rear section and automatically to engage said fixed locking member when the sections are telescoped.

2. A hay rack of the character described comprising, in combination, a front rack section having side frame supporting members; a rear rack section having side frame members straddling the front frame members; metal track rails secured to the sides of one pair of said frame members; and spaced pairs of rollers secured to the other pair of frame members to guide said tracks so that the sections may be telescoped and extended.

3. A hay rack of the character described comprising, in combination, a front rack section having side frame supporting members; a slidably mounted rear rack section also presenting side frames straddling the front frame members; metal tracks secured to one pair of frame members; and cooperating rollers on the other pair of frame members to guide the rear frame members to slide longitudinally with respect to the front frame members.

4. A hay rack of the character described comprising, in combination, a front and a rear section slidable with respect to each other, the front section having a fixed floor and the rear section presenting a sub-floor comprising boards yieldably secured at their rear ends only; fixed locking bars extending across and rigidly secured to the front section below the rear floor boards and cooperating locking means adjacent to the forward ends of and below the floor boards of the rear section to engage said locking bars automatically when the rear section is either telescoped or extended.

5. A hay rack of the character described comprising, in combination, a front section having side supporting frames; a rear section having frame members slidable with respect to said side supporting frames; floor boards on the rear section secured at their rear ends only and arranged to slide between the side frames of the front section; locking bars presenting upstanding flanges arranged between the side frames of the front section; locking means on the lower sides of the floor boards of the rear section adjacent to their forward ends including a pair of spaced flanges adapted to engage the upstanding flanges of said locking bars; guiding brackets arranged to lift the forward ends of the floor boards so that said locking flanges will engage said locking bars; a pivoted lever arranged between the side frame members of the forward section adapted to engage the forward ends of the floor boards when the sections are telescoped and lift the locking flanges out of engagement with the locking bar; and means accessible to the driver to manipulate said lever.

6. A hay rack of the character described comprising, in combination, a front section having side supporting frame members and a floor secured above said members; a rear section slidably and adjustably mounted with respect to the side frame members of the front section; a sub-floor comprising boards secured at their rear ends only to the rear end of the rear section and slidable between the side frames of the front frame section; side floor boards on the rear section guided to slide under the floor of the front section; locking bars adjacent to the front and rear ends of the front section; spaced locking flanges on the sub-floor boards of the rear section cooperating with said locking bars and having provision to engage said locking bars automatically when the sections are either telescoped or extended; means on the front section to guide said sub-floor boards and side floor boards of the rear section with respect to the frame members; and a pivoted lever mounted on the front section arranged to release said locking means; and means to manipulate said lever accessible to the driver.

In testimony, that I claim the foregoing as my own, I have hereto affixed my signature.

OSCAR J. KEHL.